Jan. 5, 1971   R. W. ETTER   3,551,997
METHODS FOR ELECTROLESS PLATING AND FOR BRAZING
Filed Oct. 6, 1967
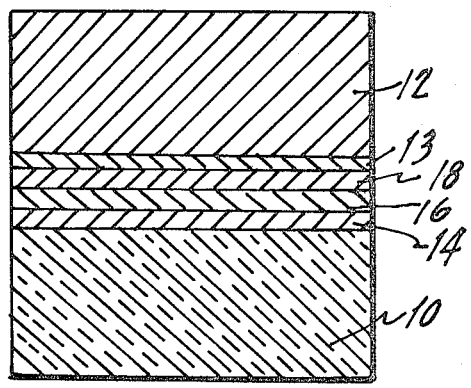
INVENTOR
Robert W. Etter
BY L. Greenspan
ATTORNEY United States Patent Office 3,551,997
Patented Jan. 5, 1971

3,551,997
METHODS FOR ELECTROLESS PLATING
AND FOR BRAZING
Robert W. Etter, Lititz, Pa., assignor to RCA
Corporation, a corporation of Delaware
Filed Oct. 6, 1967, Ser. No. 673,401
Int. Cl. B23k *31/02*
U.S. Cl. 29—473.1                             5 Claims

ABSTRACT OF THE DISCLOSURE

A method for brazing comprising metallizing the surface of an insulating or semiconducting member, electrolessly plating the metallized surface with a cobalt-copper alloy, and then brazing a metallic member to the plated surface. The presence of this cobalt-copper plating improves the wettability of the surface and reduces the penetration of the braze through the metallizing. The step of electrolessly plating includes contacting the metallized surface with an aqueous solution containing cobalt and copper ions, a reducing agent for these ions, a soluble base, and a complexing agent. The electroless plating method has the advantage that it is self-initiating in the presence of most electrical conductors.

BACKGROUND OF THE INVENTION

This invention relates to a novel method for electroless plating and to an improved method for brazing and soldering which uses the novel method for electroless plating.

In the manufacture of various products; for example, electron tubes, semiconductor devices, and the like, a nonmetallic member, such as a ceramic or a semiconductor material, is bonded to another member by brazing. It has been the practice to metallize a surface of the nonmetallic member to make it more wettable by the brazing material. In some instances, the metallized coating is comprised of two separate layers, one of which is used because it adheres strongly to the surface of the nonmetallic member, and the second because it is easily wetted by the brazing material used. For example, a ceramic member has been metallized with a layer of molybdenum or tungsten metal and then plated with nickel metal. In other instances, the metallized coating is comprised of a single layer. For example, a body of semiconductor material such as silicon, has been gold plated and, thereafter, the gold plated surface is brazed to the member to be joined thereto. As used herein, the term "brazing" is intended to include "soldering."

A problem often encountered in brazing to nonmetallic members is that sometimes the brazing material does not completely wet the metallized surface. This gives rise to voids in the brazed joint which results in weak joints. Another problem is that sometimes the brazing material penetrates through the metallized surface and contacts the nonmetallic member therebeneath. This penetration usually produces weak and nonhermetic joints.

SUMMARY OF THE INVENTION

I have discovered that improved brazes may be produced by using a method including the step of overcoating the metallized surface of the member to be brazed to with an alloy of copper and cobalt. Such an alloy, it is found, is very wettable by various brazing materials commonly used and, surprisingly, is not easily penetrated by the brazing material. In accordance with this discovery I provide a novel method for brazing comprising electrolessly plating the metallized surface of an insulating or semiconducting member with a cobalt-copper alloy and then brazing the other member to the plated surface of the member.

I also provide a novel method for electrolessly plating which has the unusual aspects that it is self-initiating in the presence of most electric conductors and that it deposits a cobalt-copper alloy. By this process, a substrate having an electrically-conducting surface is contacted with an aqueous solution comprised of cobalt and copper ions, a reducing agent for these ions, a base, and a complexing agent. The electroless plating commences immediately upon the contact of the solution with the surface, and continues until the solution is spent or is removed from contact with the surface.

BRIEF DESCRIPTION OF THE DRAWING

The sole figure is a sectional view of a metallic member and a nonmetallic member brazed together by the novel process.

DESCRIPTION OF THE PREFERRED EMBODIMENTS

Example 1

In the drawing, an alumina ceramic member 10 is shown brazed to a metal member 12. The metal member is comprised of an alloy of iron, nickel and cobalt having the trade name "Kovar." A thin, e.g. 0.1 to 0.2 mil, plating 13 of nickel is provided on a surface of the metal member 12. The ceramic member 10 has a thin, e.g. 1.0 mil, metal layer 14 of molybdenum metal on its surface. Plated over the molybdenum layer 14 is a layer 16 of an alloy comprising by weight approximately 89.5% copper and 10.5% cobalt on the average. The weight of the layer 16 is in the order of 0.0025 gram/cm.$^2$. The layer 16 is applied by an electroless plating process described hereinafter, which provides the layer 16 with a composition which varies through the thickness of the layer. By this is meant that the proportion of copper in the layer 16 increases from the bottom of the layer upwards and through to the surface thereof. The given composition refers to the average proportions of cobalt and copper in the layer 16. The ceramic member 10 is brazed to the metal member 12 with a commercially available brazing material 18 comprised of about 92.5 weight percent silver and the balance copper having the trade name "BT braze."

Other nonmetallic insulating materials such as beryllia ceramics, glasses, wood and plastics can be substituted for the ceramic member 10 in Example 1. Other commercially-available braze compositions such as an alloy comprised of nickel, gold and iron having the trade name "Nioro" can be used. The metal member 12 can likewise be substituted for by any metal member that will alloy with the braze material that is used. In other embodiments, two ceramic members 10 each metallized and overplated with a cobalt-copper alloy layer can be brazed together using the brazing compositions noted.

In other embodiments of the invention, the metallized layer 14 may be a layer of molybdenum metal, tungsten metal or other metal, or may be a layer of metallic ions which will initiate electroless plating of the cobalt-copper alloy out of the plating solution. A layer of metallic ions is sometimes referred to as a "sensitizing layer" and the process step is referred to as a "sensitizing." In these embodiments, the surface of the member is sensitized after which the cobalt-copper alloy is applied to the sensitized surface of the nonmetallic member and then is brazed to. As used herein, the term "metallizing" is intended to include both "sensitizing" and providing a layer of metal.

Neither the thickness nor the composition of the cobalt-copper alloy is considered to be critical. Satisfactory results have been obtained using alloys ranging in average composition from about 89.5% to 96.0% copper and the balance cobalt. And, satisfactory results have been obtained using cobalt-copper alloy layers having a thickness ranging from about 0.1 to 0.5 mil.

By using an electrolessly plated layer of cobalt-copper alloy, the wettability to the braze material of the surface of the nonmetallic member is improved, and the penetration of the braze material through the metallized layer is reduced. These improvements are surprising in view of the fact that a layer of cobalt metal by itself or of nickel metal by itself have voids in the brazed joints and allow greater penetration of the braze material through the metallized layer. Also, a layer of copper by itself does not prevent braze penetration through the metallization and produces relatively weak braze joints.

Example 2

In this example, a silicon semiconductor member is brazed to a steel member. Each member can have, for example, the shape of the members 10 and 12 shown in the drawing. For this reason, a separate illustration has not been provided. One surface of the silicon member is plated with a thin plating of gold about 0.5 mil thick. The gold plating is overcoated with a thin layer of an alloy comprised approximately of 89.5 weight percent copper and 10.5 weight percent cobalt in a weight of about 0.0020 gram/cm.$^2$. The cobalt-copper alloy is applied by an electroless plating process described hereinafter.

The steel member to which the silicon is brazed is plated with a thin coating of nickel metal prior to brazing. The brazing is accomplished using a copper brazing material which can be provided as a separate layer of material between the members or, more conveniently, as a 1.0 mil thick cladding on top of the cobalt-copper alloy on the silicon member. Other semiconductor materials, for example germanium, can be substituted for the silicon member in this assembling.

ELECTROLESS PLATING

I have discovered that it is possible to electrolessly plate cobalt-copper alloys from aqueous solutions. This is surprising in view of the fact that cobalt and copper each require substantially different conditions for electroless plating individually. What is even more surprising is that the electroless plating of a cobalt-copper alloy is self-initiating upon contact with most electrically conducting surfaces, whereas electroless plating of copper and cobalt individually are not self-initiating.

For electrolessly plating cobalt-copper alloys, aqueous plating solutions are prepared containing cobalt and copper ions, a reducing agent for reducing these ions during plating, a soluble base, and a complexing agent. The sources of cobalt and copper ions can be any of the water-soluble salts of copper and cobalt dissolved in the plating solution. Examples of such soluble salts are the sulphate, chloride, nitrate, and citrate salts of these ions. The sulphates are preferred because they are generally available and least expensive.

The ratio of cobalt to copper ions in the plating solution affects the composition of the alloy plated out of the solution. Suitable ratios of cobalt to copper ions are indicated in the table below. The plated alloys generally have a lower ratio of cobalt to copper than in the plating solution which produces them. Plating solutions having ratios of cobalt to copper ions outside of the range shown in the table may also be used.

A complexing agent is used to maintain a common valence for the cobalt and copper ions. Preferably, the ions are bivalent and hence are cupric and cobaltous ions. Maintaining this valence condition decreases the number of electrons required to convert the ions to the metallic form and to increase the efficiency of the plating. An example of a suitable complexing agent is sodium potassium tartrate ($KNaC_4H_4O_6 4H_2O$).

A base is present in the plating solution for the purpose of maintaining the pH of the solution in excess of 12.7 and up to 14.0. This extremely alkaline condition of the solution apparently aids in complexing the cobalt and copper ions. Various hydroxides, such as ammonium hydroxide and potassium hydroxide can be used for this purpose.

A reducing agent, such as formaldehyde, is included in the solution for the purpose of reducing the cobalt and copper ions to metallic form during electroless plating. The amount of reducing agent used differs for different plating solution compositions, and is usually selected to optimize the rate of plating the cobalt-copper alloy.

Any substrate having an electrically-conducting surface may be used to receive the electrolessly deposited cobalt-copper alloy. Almost any metallic surface or sensitized surface can be electrolessly plated with an alloy of cobalt and copper by contacting the surface of the substrate with the plating solution. A preferred method is to immerse the substrate in the plating solution where it remains for a period of time until the desired thickness has been deposited. The surface of the plating is then rinsed and dried. The plating process is self-initiating for almost all of these surfaces. Platinum and gold, however, are two of the metals which do not initiate electroless plating from the solutions described herein. Where the substrate does not initiate the plating, the plating may be started by including in the process the step of contacting the metallizing on the substrate with an iron or an aluminum metal body, such as a rod. Thus, in Example 2, where the substrate is gold plated, electroless plating with the solutions described herein may be initiated by contacting the gold plating with an iron or an aluminum rod.

The composition of the plated alloy is affected by the composition of the plating solution from which it is formed. During the plating process, however, the rates at which the cobalt and the copper will plate onto the substrate vary nonuniformly whereby the composition of the plated alloys varies through the thickness of the plating.

Some examples of plating solutions and the approximate plating rate at room temperature are given in the table below. In the table, the compositions are given in grams/liter except for formaldehyde, which is given in ml./liter and Tergitol, which is given in drops/liter. Tergitol is the trade name for a wetting agent.

TABLE

| Example | 3 | 4 | 5 | 6 | 7 | 8 | 9 | 10 | 11 | 12 | 13 | 14 | 15 |
|---|---|---|---|---|---|---|---|---|---|---|---|---|---|
| Ingredient: | | | | | | | | | | | | | |
| Cobaltous sulfate | 9 | 0.5 | 2.5 | 5 | 7.5 | 7.5 | 7.5 | 5 | 2.5 | 7.5 | 2.5 | 5 | 5 |
| Cupric sulfate | 1 | 9.5 | 7.5 | 5 | 2.5 | 2.5 | 2.5 | 5 | 7.5 | 2.5 | 7.5 | 5 | 5 |
| Sodium hydroxide | 7 | 7 | 7 | 7 | 7 | 7 | 7 | 10 | 10 | 10 | | 7 | 7 |
| Sodium gluconate | | | | | | | 12.5 | | | | 12.5 | | |
| Sodium potassium tartrate | 10 | 10 | 5 | 5 | 5 | 25 | | 10 | 10 | 10 | | 5 | 5 |
| Citric acid | | | | | | | | | | | | 2.5 | 1.5 |
| Formaldehyde 40% ml./l. | 10 | 10 | 10 | 10 | 10 | | 3 | 4 | 4 | 4 | 4 | 4 | 4 |
| Tergitol NPX drops/L | 4 | 4 | 4 | 4 | 4 | | | 4 | | | | | |
| Plating rate gm. x 10$^{-4}$/cm.$^2$/hr | 0.86 | 9.2 | 3.9 | 2.1 | 1.7 | 1.3 | 0.79 | 4.0 | 6.0 | 1.7 | 0.93 | 3.9 | 3.6 |

I claim:
1. The method for brazing a non-metallic member to another member comprising
   (1) metallizing the surface of said non-metallic member,

(2) electrolessly plating said metallized surface with a cobalt-copper alloy, said alloy containing at least 4 weight percent cobalt, (3) and then brazing said other member to said plated metallized surface, said metallizing and said members have melting points above the temperature required for said brazing.

2. The method defined in claim 1 wherein the step of electrolessly plating includes contacting said metallized surface with an aqueous solution containing cobalt and copper ions, a reducting agent for said ions, a complexing agent for said ions, and a soluble base.

3. The method defined in claim 1 wherein the step of metallizing includes providing a layer of metal upon said surface.

4. The method defined in claim 1 wherein the step of metallizing includes providing a layer of metallic ions upon said surface.

5. The method defined in claim 1 including the steps of:

(1) metallizing the surface of said non-metallic member with a layer of molybdenum metal, (2) contacting said metallized surface with an aqueous solution containing cobalt and copper ions, a reducing agent for converting said ions to metallic form during plating, a complexing agent for maintaining said ions at a common valence prior to plating, and a soluble base for maintaining the pH of said solution above 12.7, whereby to plate a layer of cobalt-copper alloy upon said molybdenum metal layer.

(3) and then brazing said other member to said plated surface.

References Cited

UNITED STATES PATENTS

| | | | |
|---|---|---|---|
| 2,629,922 | 3/1953 | Finch | 29—502X |
| 2,827,399 | 3/1958 | Eisenberg | 117—130E |
| 2,835,967 | 5/1958 | Umblia | 29—473.1X |
| 3,006,069 | 10/1961 | Rhoads et al. | 29—473.1 |
| 3,075,856 | 1/1963 | Lukes. | |
| 3,095,309 | 6/1963 | Zeblinsky et al. | |
| 3,197,859 | 8/1965 | Cape | 29—504X |
| 3,226,822 | 1/1966 | Budde et al. | 29—473.1 |
| 3,257,215 | 6/1966 | Schneble, Jr., et al. | |
| 3,403,035 | 9/1968 | Schneble, Jr., et al. | 117—130EX |
| 3,446,657 | 5/1969 | Dunlap, Jr., et al. | 117—130EX |

OTHER REFERENCES

D. V. Subrahmanyam et al., "Electrodeposition of Copper-Cobalt Alloys From the Pyrophosphate Bath," Electroplating and Metal Finishing, pp. 44–49, February 1967.

JOHN F. CAMPBELL, Primary Examiner

R. J. SHORE, Assistant Examiner

U.S. Cl. X.R.

29—492, 504; 117—130E